F. J. LEIGH.
ARM REST FOR CAR SEATS.
APPLICATION FILED NOV. 17, 1909.
1,022,632.
Patented Apr. 9, 1912.
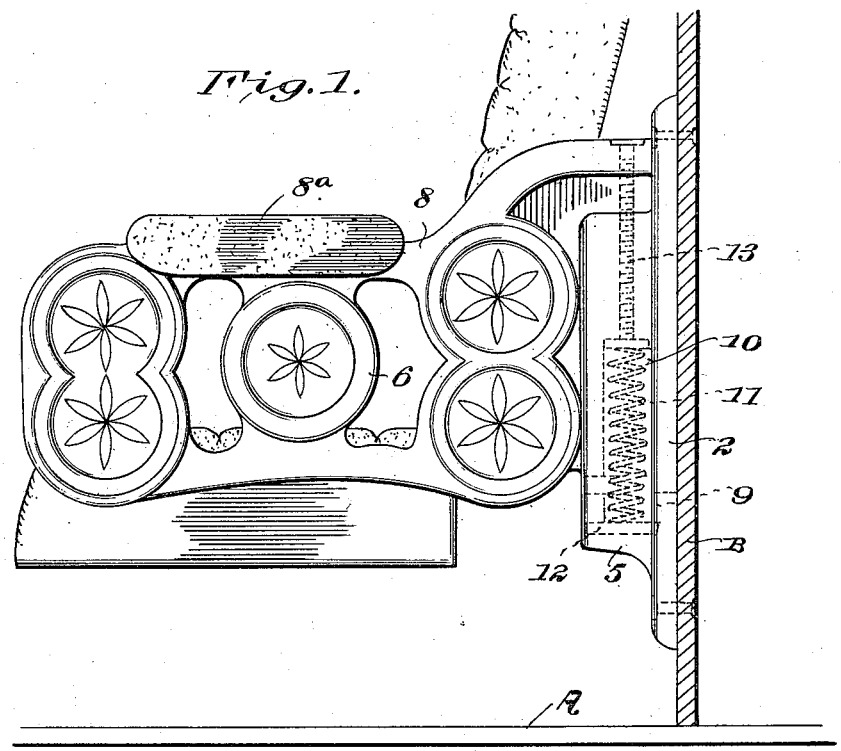
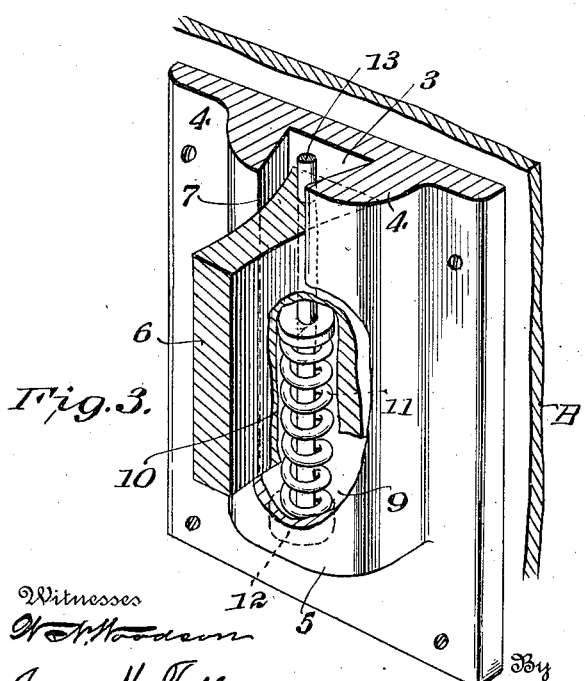
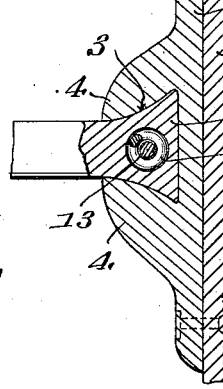
Inventor
Frederick J. Leigh,

UNITED STATES PATENT OFFICE.

FREDERICK J. LEIGH, OF SEATTLE, WASHINGTON, ASSIGNOR TO IMPERIAL CAR SHIPBUILDING AND DRY DOCK CORPORATION, OF SEATTLE, WASHINGTON.

ARM-REST FOR CAR-SEATS.

1,022,632.        Specification of Letters Patent.        Patented Apr. 9, 1912.

Application filed November 17, 1909. Serial No. 528,496.

*To all whom it may concern:*

Be it known that I, FREDERICK J. LEIGH, citizen of the United States, residing at Seattle, in the county of King and State of Washington, have invented certain new and useful Improvements in Arm-Rests for Car-Seats, of which the following is a specification.

My invention relates to an arm rest for car seats and particularly to an arm rest designed for use in railway compartment cars, as described in my pending application, Serial No. 530,551, filed on the 30th day of November, 1909, said arm rest being used in conjunction with a convertible seat and berth as described in my application Serial No. 528,497, filed November 17, 1909.

The object of my invention is to provide an arm rest for car seats which is not connected neither to the seat nor to the floor, but is raised several inches from the floor, thus giving free access to the space beneath the arm rest for cleansing the car.

A further object is to provide an arm rest which is removable in case of accident or for other reasons, and a still further object is to provide an arm rest so supported as to absorb all jar when the car passes over crossings or on rough road bed.

The invention consists primarily in an arm rest removably supported in guides upon the body of a car, as upon the partition plate of a car compartment, the arm rest or the support being provided with a coil spring upon which the arm rest is yieldably supported.

For a full understanding of the invention and the merits thereof, and to acquire a knowledge of the details of construction, reference is to be had to the following description and accompanying drawings, in which:

Figure 1 is a side elevation of my improved chair arm; Fig. 2 is a fragmentary horizontal section; and, Fig. 3 is a perspective sectional view partly broken away.

Corresponding and like parts are referred to in the following description and indicated in all the views of the drawings by the same reference characters.

Referring to these figures, A designates the floor of a car, and B the partition plate of a car compartment. Attached to the partition plate B is a vertically extending base plate 2 which is provided with the longitudinally extending dove-tailed slot 3. This being cut out of the middle of the plate 2 leaves on each side the guide flanges 4, which guide flanges extend inwardly and toward each other. The lower end of the plate 2 is provided with a bracket 5. Supported in the guide flanges 4 is the rear edge of an arm rest 6. This rear edge has the shape of a dove tail in section as at 7, so as to fit snugly between the guides 4 and to slide vertically therein. The upper end 8 of the arm rest support 6 is formed to support the cushion 8ª and projects over the web 6 and is therefore wider than the slot 3 in plate 2. The bracket 5 is preferably formed with a socket 9, and the expanded edge 7 of the web 6 is also formed with a socket 10 alining with the socket 9. Preferably located within the socket 10 is the coil spring 11 which projects down below the bottom of the expanded edge 7 and is provided at its lower extremity with a bearing plate 12 which is adapted to bear on the bottom of the socket 9 in the projecting bracket or flange 5. The upper end of the coil spring is held in place within the socket 9 by a screw rod 13 which extends to the upper side of the arm rest so that the spring may be readily detached.

It will be seen that the arm rest and its support as devised by me, have no connection with the floor, are portable, and can be removed in a moment in case of accident or for any other purpose. It further gives more foot space and freedom of movement within the section, and eliminates any floor obstruction such as is necessary with the usual car arm rest which is screwed upon the floor. Further, the spring 11 takes up all jar and shock, and the car vibration is not communicated to the arm rest.

The invention is to be used in connection with the berth forming the subject matter of my application, Serial No. 528,497, patented August 9, 1910, No. 967,137, previously referred to, as this berth is so constructed as to be entirely free from the sides or bottom of the car and thus leave the floor space entirely unobstructed when it is desired to clean the same. This combined berth and seat is designated C in the drawings. The seat and back therefor are entirely independent of the seat arm, the seat and back therefor being supported from above in any suitable manner, while the seat arm is supported upon the partition B which divides one compartment of the car from the next. It will thus be seen that by reason of my peculiar construction the seat arm is entirely independent of the seat itself, does not move therewith, and is cushioned against jar or shock by reason of the coil spring upon which the arm rests in the base plate 2.

Having thus described the invention, what I claim is:—

The combination with a seat, of a supporting member independent of the seat, a base plate mounted on the supporting member and having a dove-tailed groove extending vertically therein, a car seat arm independently movable with relation to the seat and having a dovetailed end portion engaging in said groove, a bracket closing the lower end of the groove, and a coiled spring carried between the upper face of the bracket and the lower face of the dovetailed end of the arm, whereby the arm is resiliently supported for vertical movement.

In testimony whereof I affix my signature in presence of two witnesses.

FREDERICK J. LEIGH. [L. S.]

Witnesses:
JOHN J. LOUGHRAN,
ROBERT A. ORGAN.

Copies of this patent may be obtained for five cents each, by addressing the "Commissioner of Patents, Washington, D. C."